United States Patent
Ramachandra et al.

(10) Patent No.: US 10,620,324 B2
(45) Date of Patent: Apr. 14, 2020

(54) RADIATION DETECTION APPARATUS AND RELATED METHOD

(71) Applicant: General Electric Company, Schenectady, NY (US)

(72) Inventors: Srinidhi Ramachandra, Bangalore (IN); Wusheng Xu, Shanghai (CN); Alok Mani Srivastava, Niskayuna, NY (US); Gopi Chandran Ramachandran, Bangalore (IN); Prasanth Kumar Nammalwar, Bangalore (IN); Sergei Ivanovich Dolinsky, Niskayuna, NY (US); Helene Claire Climent, Sugarland, TX (US)

(73) Assignee: Baker Hughes Oilfield Operations, LLC, Houston, TX (US)

( * ) Notice: Subject to any disclaimer, the term of this patent is extended or adjusted under 35 U.S.C. 154(b) by 5 days.

(21) Appl. No.: 15/315,035

(22) PCT Filed: May 14, 2015

(86) PCT No.: PCT/US2015/030679
§ 371 (c)(1),
(2) Date: Nov. 30, 2016

(87) PCT Pub. No.: WO2015/183563
PCT Pub. Date: Dec. 3, 2015

(65) Prior Publication Data
US 2017/0097426 A1 Apr. 6, 2017

(30) Foreign Application Priority Data
May 30, 2014 (CN) .......................... 2014 1 0239971

(51) Int. Cl.
*G01T 1/202* (2006.01)
*G01V 5/04* (2006.01)
*G01T 1/20* (2006.01)

(52) U.S. Cl.
CPC .......... *G01T 1/2023* (2013.01); *G01T 1/2018* (2013.01); *G01V 5/04* (2013.01)

(58) Field of Classification Search
CPC .............................. G01T 1/202; G01T 1/2023
See application file for complete search history.

(56) References Cited

U.S. PATENT DOCUMENTS 6,768,326 B2   7/2004   Brown et al.
7,002,156 B2   2/2006   Sandvik et al.
(Continued)

FOREIGN PATENT DOCUMENTS

EP      1865043 A1   12/2007

OTHER PUBLICATIONS

Pr3+ luminescence center in Lu2Si2O7 host, Phys. Status Solidi RRL 3, No. 9, 293-295 (2009) to Niki et al.*
(Continued)

*Primary Examiner* — Kenneth J Malkowski
(74) *Attorney, Agent, or Firm* — Mintz Levin Cohn Ferris Glovsky and Popeo, P.C.

(57) ABSTRACT

A method and an apparatus for detecting photons are disclosed. The apparatus includes a scintillator single crystal and an avalanche photodiode coupled to the scintillator single crystal. The scintillator single crystal is at a temperature greater than about 175° C. and at a shock level in a range from about 20 Grms to about 30 Grms. The scintillator single crystal includes a praseodymium doped composition selected from $(La_xY_{1-x})2Si_2O_7{:}Pr$, $ABCl_{3-y}X_y{:}Pr$, $A_2(Li,Na)LaCl_{6-y}X_y{:}Pr$, or any combinations thereof. As used herein A is cesium, rubidium, potassium, sodium, or a combination (Continued)

thereof, B is calcium, barium, strontium, magnesium, cadmium, zinc, or a combination thereof, and X is bromine, iodine, or a combination thereof. Further, ($0<x<1$), and ($0<y<3$).

6 Claims, 5 Drawing Sheets

(56) References Cited

U.S. PATENT DOCUMENTS

| | | | |
|---|---|---|---|
| 7,019,284 B2 | 3/2006 | Srivastava et al. | |
| 7,541,589 B2 | 6/2009 | Srivastava et al. | |
| 7,763,845 B2 | 7/2010 | Estes et al. | |
| 7,939,808 B1 * | 5/2011 | Shah | G01T 1/202 250/370.11 |
| 7,977,645 B1 | 7/2011 | Shah et al. | |
| 8,299,436 B2 | 10/2012 | Srivastava et al. | |
| 8,536,517 B2 | 9/2013 | Berheide et al. | |
| 8,815,119 B2 * | 8/2014 | Zhuravleva | C09K 11/7733 117/940 |
| 2005/0285041 A1 * | 12/2005 | Srivastava | C09K 11/772 250/361 R |
| 2009/0146065 A1 * | 6/2009 | Srivastava | G01T 1/202 250/361 R |
| 2012/0267519 A1 | 10/2012 | Nikitin et al. | |
| 2012/0273726 A1 * | 11/2012 | Zhuravleva | C09K 11/7733 252/301.4 H |
| 2015/0285942 A1 | 10/2015 | Soloviev et al. | |

OTHER PUBLICATIONS

Crystal Structure and Luminescent Properties of Eu3+ doped La2Si2O7 tetragonal phase stabilized by Spray Pyrolysis Synthesis, J. Phys. Chem. C 2013, 117, 20876-20886 to Fitch et al.*

"Novel Scintillation Material CS2LiLaBr6_xClx:Ce for Gamma-ray and Neutron Spectroscopy", 2012 IEEE Nuclear Science Symposium and Medical Imaging Conference Record, p. 1963-1967 to Glodo et al.*

"Structure and scintillation properties of Ce3+ activated Cs2NaLaCl6, Cs3LaCl6, Cs2NaLaBr6, Cs3LaBr6, Cs2NaLaI6 and Cs3LaI6" to Gundiah et al., Journal of Luminescence (2013), pp. 374-384 to Gundiah et al.*

"Scintillation and spectroscopy of the pure and Ce3+-doped elpasolites: Cs2LiYX6 (X=Cl, Br)" to Loef et al., J. Phys.: Condens. Matter 14 (2002) 8481-8496 (2002).*

"Luminescence Properties of Ce3+, Pr3+ and Nd3+ Activated Scintillators for Positron Emission Tomography (PET)" to Zych (2011), pp. 1-169.*

Cha et al., "Comparison of 4H-SIC Separate Absorption and Multiplication Region Avalanche Photodiodes Structures for UV Detection", IEEE Sensors 2006, EXCO, Daegu, Korea, pp. 14-17, Oct. 22-25, 2006.

Watanabe et al., "Temperature Dependence of Neutron-Gamma Discrimination Based on Pulse Shape Discrimination Technique in a Ce : LiCaAlF6 Scintillator", IEEE Transactions on Nuclear Science, vol. No. 60, Issue No. 2, pp. 959-962, Apr. 2013.

Tyagi et al., "Theoretical and Experimental Characterization of Promising New Scintillators: Eu2+ doped CsCaCl3 and CsCaI3", Journal of Applied Physics, American Institute of Physics, US, vol. No. 113, Issue No. 20, pp. 203504-1-203504-9, May 23, 2013.

Wei et al., "Preparation and Spectroscopic Properties of Ce-doped La2Si2O7 as Novel Scintillator Materials", Materials Letters, vol. No. 126, pp. 178-180, Apr. 13, 2014.

PCT Search Report and Written Opinion issued in connection with corresponding PCT Application No. PCT/US15/030679 dated Aug. 25, 2015.

* cited by examiner

RADIATION DETECTION APPARATUS AND RELATED METHOD

BACKGROUND

This invention relates generally to scintillator single crystals and, more particularly, to a scintillator single crystal that operates at a high temperature and detects a high-energy radiation.

There is currently a need for gamma ray detection in the oil well drilling industry. Gross gamma-ray counting is normally used for log depth matching and as shale/sand contrast indicator. Gamma-ray detectors may also be used to derive lithology, porosity, and permeability indicating the location, volume and ease of extraction of the oil. A small, robust sensor capable of detecting such rays is highly desirable and necessary for harsh, down-hole environments where shock levels are more than 20 root mean square acceleration (Grms) and temperatures may vary widely from below room temperature to exceeding 175° Celsius (C).

Several current technologies utilize gamma sensors that include photomultiplier tubes (PMTs) spectrally matched to scintillators. The scintillators emit UV or blue light when excited by a high energy radiation such as gamma radiation, and the PMTs are used to transform UV or blue light signals to readable level electronic signals. However, life time of the PMTs considerably reduce at high temperatures. Hence, the lifetimes of PMTs may become prohibitively short, thereby driving up the cost of their use sharply. Further, PMTs often require high operating voltages and are also fragile and prone to failure when vibration levels are high. Usage of solid state avalanche photodiode (APD)s instead of PMTs for the detection of high-energy radiation is desirable at these conditions.

Solid state avalanche photodiodes may have different spectral profile than the PMTs, and the scintillators that operate with the solid state APDs are desirable to be spectrally matched to the APDs. Gamma-ray peak resolving capacity of the currently used scintillator of alkaline halide crystal activated by tellurium ion degrades significantly at temperature>175° C. Orthosilicates of lutetium and yttrium were earlier used as scintillator materials. However, these orthosilicates were found to be not having high-temperature stable emission properties. Praseodymium doped lutetium pyrosilicate scintillator were studied for positron emission tomography (PET) application. However, lutetium, lanthanum, gadolinium, and rubidium are known to have inherent gamma ray emission and hence may not be best to be used for the detection of high-energy radiation detection including gamma radiation.

Therefore, there is an existing need to have apparatus and methods that operate at a wide variety of temperature levels including at temperatures as high as or higher than 175° C., for detecting high energy radiation without much deterioration of the detected signals.

BRIEF DESCRIPTION

Embodiments of the invention are directed towards an apparatus having a scintillator single crystal and its method of working.

In one embodiment, a method of detecting high energy radiation in a harsh environment is disclosed. The method includes exposing a scintillator single crystal to the high energy radiation at a temperature greater than about 175° C. and detecting the high energy radiation with a an avalanche photodiode coupled to the scintillator. The scintillator single crystal includes a praseodymium doped composition selected from $(La_xY_{1-x})_2Si_2O_7$:Pr, $ABCl_{3-y}X_y$:Pr, $A_2(Li, Na)LaCl_{6-y}X_y$:Pr, or any combinations thereof. As used herein A is cesium, rubidium, potassium, sodium, or a combination thereof, B is calcium, barium, strontium, magnesium, cadmium, zinc, or a combination thereof, and X is bromine, iodine, or a combination thereof. Further, $(0<x<1)$ and $(0 \leq y < 3)$.

In one embodiment, an apparatus for detecting high energy radiation in a harsh environment is disclosed. The apparatus includes a scintillator single crystal and an avalanche photodiode coupled to the scintillator single crystal. The scintillator single crystal is at a temperature greater than about 175° C. and at a shock level greater than about 20 Grms. The scintillator single crystal includes a praseodymium doped composition selected from $(La_xY_{1-x})_2Si_2O_7$:Pr, $ABCl_{3-y}X_y$:Pr, $A_2(Li, Na)LaCl_{6-y}X_y$:Pr, or any combinations thereof. As used herein A is cesium, rubidium, potassium, sodium, or a combination thereof, B is calcium, barium, strontium, magnesium, cadmium, zinc, or a combination thereof, and X is bromine, iodine, or a combination thereof. Further, $(0<x<1)$ and $(0 \leq y < 3)$.

DRAWINGS

These and other advantages and features will be more readily understood from the following detailed description of preferred embodiments of the invention that is provided in connection with the accompanying drawings.

DETAILED DESCRIPTION

Aspects of the present invention will now be described in more detail with reference to exemplary embodiments thereof as shown in the appended drawings. While the present invention is described below with reference to preferred embodiments, it should be understood that the present invention is not limited thereto. Those of ordinary skill in the art having access to the teachings herein will recognize additional implementations, modifications, and embodiments, as well as other fields of use, which are within the scope of the present invention as disclosed and claimed herein, and with respect to which the present invention could be of significant utility.

In the following description, whenever a particular aspect or feature of an embodiment of the invention is said to comprise or consist of at least one element of a group and combinations thereof, it is understood that the aspect or feature may comprise or consist of any of the elements of the group, either individually or in combination with any of the other elements of that group.

In the following specification and the claims that follow, the singular forms "a," "an," and "the" include plural referents unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "about" or "substantially," may not be limited to the precise value specified, and may include values that differ from the specified value. In at least some instances, the approximating language may correspond to the precision of an instrument for measuring the value.

An aspect of the present invention is directed to a scintillator single crystal for use in oil well drilling applications in harsh, down-hole environments where shock levels are in the range of about 20-30 Grms. Further, the scintillator single crystal described herein is operable at a high temperature, and at a wide temperature range, and is less sensitive to temperature variation.

Scintillator materials are in common use as a component of radiation detectors for gamma-rays, X-rays, cosmic rays and particles characterized by an energy level of greater than about 1 keV. A scintillator crystal is coupled with a light-detection means, that is, a photo detector. When photons from a radionuclide source impact the crystal, the crystal emits light. The photo detector produces an electrical signal proportional to the number of light pulses received, and to their intensity.

Figure 1:
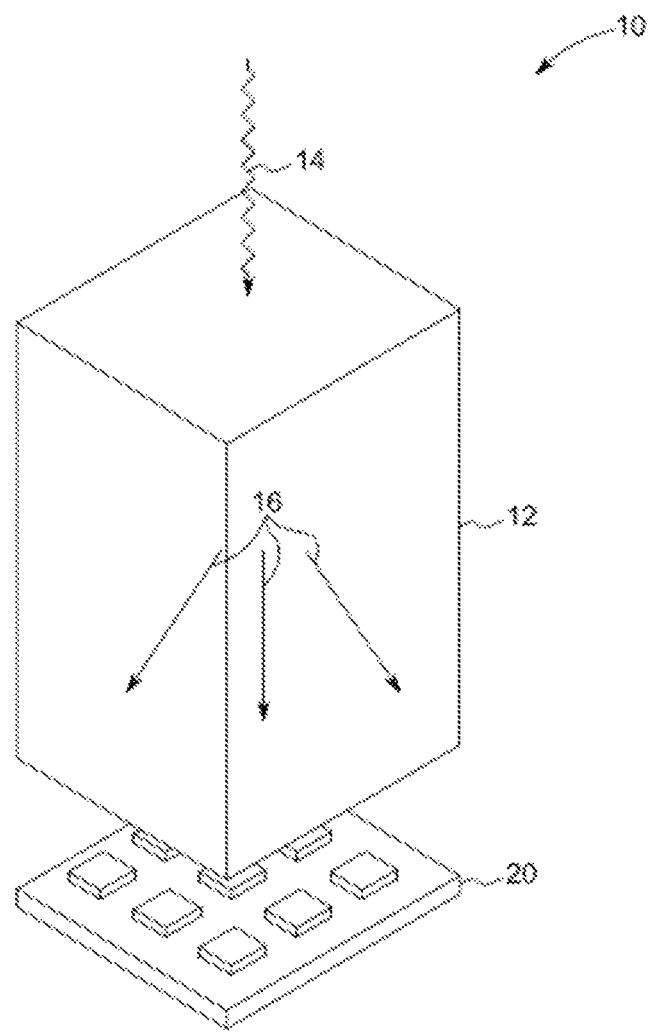
FIG. 1 is perspective view of an apparatus including the solid state photo multiplier device, according to an embodiment of the present invention.

In an exemplary embodiment disclosed in FIG. 1, a system 10 includes a scintillator 12. A scintillator material can absorb the radiation energy through the excitation of electrons and holes. These electrons and holes can recombine and emit photons. In the present embodiment, the scintillator 12 is capable of converting high energy radiation 14 into photons 16. A photo detector device 20 may include one or more avalanche photodiodes to detect the photons 16 and convert them to electrical or electronic signals (not shown) that can be detected by an associated electronics to determine time, energy, and position of the impinged high energy radiation. In one embodiment, the system 10 is an apparatus for the detection of high-energy radiation.

Generally, desirable properties of a scintillator material include high density (for high radiation stopping power), high light output, fast decay time, high energy resolution, good environmental stability, and the availability of large single crystals. These properties are related to the fundamental material properties, i.e., band gap (important for the light output), carrier transport efficiency (relevant to scintillation decay), and optical, chemical, and structural properties.

"Stopping power" is the ability of a material to absorb radiation, and is directly related to the density and Z (atomic number) of the scintillator material. Scintillator materials which have high stopping power allow little or no radiation to pass through, and this is a distinct advantage in efficiently capturing the radiation.

As used herein, the term, "light output" is the quantity of visible light emitted by the scintillator after being excited by a pulse of the x-ray or gamma ray. High light output is desirable because it enhances the radiation detector's ability to convert the light into an electric pulse.

The term "decay time" refers to the time required for the intensity of the light emitted by the scintillator to decrease to a specified fraction of the light intensity at the time when the radiation excitation ceases. For many applications, such as the PET devices, shorter decay times are desirable because they allow efficient coincidence-counting of gamma rays. Consequently, scan times are reduced, and images can be improved by eliminating random counts due to accidental coincidences.

The "energy resolution" of a radiation detector refers to its ability to distinguish between energy rays (e.g., gamma rays) having very similar energy levels. Energy resolution is usually reported as a percentage value, after measurements are taken at a standard radiation emission energy for a given energy source. Lower energy resolution values are very desirable, because they usually result in a higher quality radiation detector.

The scintillator materials may be prepared and used in various forms. For example, in some embodiments the scintillator material is in monocrystalline (single crystal) form. The scintillator 12 in its single crystal form has a greater tendency for transparency and is especially useful for high-energy radiation detectors such as those used to detect gamma rays. Therefore, in one embodiment of the invention, the scintillator material used herein is in its single crystal form.

The disclosed scintillator 12 of this specification is configured to detect radiation while operating at a wide temperature window, without substantial loss of radiation detection capability. The scintillator 12 disclosed herein is capable of operating at a temperature range of sub-room temperatures to elevated temperature, such as, for example, −50° C. to 225° C. In one embodiment, the scintillator is configured to operate at a temperature range of −40° C. to 200° C.

In one embodiment, the scintillator 12 is configured to operate at elevated temperatures such as, for example, greater than 175° C. As used herein, the scintillator is "configured to operate at a temperature greater than 175° C." means that the scintillator is capable of operating at temperature greater than 175° C., without losing its capability of operating at temperatures less than 175° C. In a further embodiment, the scintillator 12 is configured to operate at temperatures even greater than 200° C. In another embodiment, the scintillator 12 may be operated at temperatures below room temperature. In one embodiment, the scintillator 12 may be configured to operate at a temperature less than about −40° C.

In one embodiment, the disclosed scintillator 12 is configured to detect impinging radiation while operating at a wide temperature range of over 200° C., without substantial loss of radiation detection capability. As used herein "detecting radiation while operating at a wide temperature range of over 200° C." means that a single arrangement of the scintillator 12 is capable of operating in this temperature window without any substantial change in the composition or arrangement of the scintillator 12 for the operation of any sub-window of this temperature range. For example, the scintillator 12 in its one configuration may be able to operate from −25° C. to up to 175° C., without the need to replace or readjust the composition of the scintillator or without the need of extra protection to the scintillator. In another exemplary embodiment, the scintillator in its one configuration with a particular composition is able to operate from 0° C. to up to 200° C., without the need to change the configuration or composition of the scintillator and without the need of extra protection to the scintillator.

As used herein, the terms "capable of operating" or "configured to operate" at a temperature range means that there is no substantial variation in the peak light output of the scintillator 12 at any temperature window of the disclosed temperature range. As used herein, the "light output of the scintillator" is the total number of photons emitted upon interaction with an ionizing radiation. Normally, the light output of the scintillator is measured as number of photons/MeV.

The scintillator 12 disclosed herein may be configured to operate with a high light output at the specified temperature ranges when compared with the existing scintillator materials. The peak light output of many of the currently used scintillator materials are expected to drop considerably at high temperatures such as, for example, greater than 175° C. A drop in light output of greater than 80% is normally seen in many of the generally used scintillator materials. The variation in light output at high temperatures may be measured using relative photoluminescence intensity at that temperature with respect to room temperature.

The scintillator materials of the various embodiments used herein are having substantially high light output even at high temperatures. In one embodiment, photoluminescence intensity (alternately luminescence intensity) of the single crystal scintillator described herein at a temperature greater than 200° C. is greater than about 60% of the luminescence intensity of that single crystal at room temperature. That is, the luminescence intensity drop from room temperature to a temperature above 200° C. is less than about 40%. In a further, particular embodiment, the scintillator single crystal at a temperature greater than 200° C. has luminescence intensity that is greater than about 75% of the luminescence intensity of the same single crystal at room temperature.

Some embodiments of the invention here are directed at a scintillator material that includes a praseodymium doped composition selected from $(La_xY_{1-x})_2Si_2O_7:Pr$; $ABCl_{3-y}X_y:Pr$; $A_2(Li, Na)LaCl_{6-y}X_y:Pr$, or any combinations of these compositions. As used herein A is cesium, rubidium, potassium, sodium, or any combinations of any of cesium, rubidium, potassium, and sodium and B is calcium, barium, strontium, magnesium, cadmium, zinc, or any combinations of any of calcium, barium, strontium, magnesium, cadmium, and zinc. X may be bromine, iodine, or a combination of bromine and iodine. X can vary between 0 and 1 without including the end points and y may be 0 or may be varying between 0 and 3 without including the end points.

The amount of activator present in a scintillator composition will depend on various factors, such as the host material being used, the lattice site in which the activator gets substituted, the desired emission properties and decay time, and the type of detection device into which the scintillator is being incorporated. In some embodiments of this invention praseodymium trivalent ion is used as an activator.

Praseodymium is used as the dopant in the scintillator compositions in different embodiments used herein. The amount of praseodymium present in the scintillator single crystal may range from about 0.5 atomic % to about 10 atomic %. In one embodiment, the praseodymium doping level in the scintillator single crystal is in a range from about 0.5 atomic % to about 2 atomic %.

Further, the scintillator material used herein is desirable to have an emission wavelength in the range of about 200 nm to about 400 nm to match the spectral wavelength of the APD that is best suited to be used along with this scintillator for the radiation detection. In one embodiment, the scintillator material used herein has an emission wavelength greater than about 200 nm, and less than about 400 nm. In a further embodiment, scintillator material has an emission wavelength in a range from about 275 nm to about 350 nm.

Figure 3:
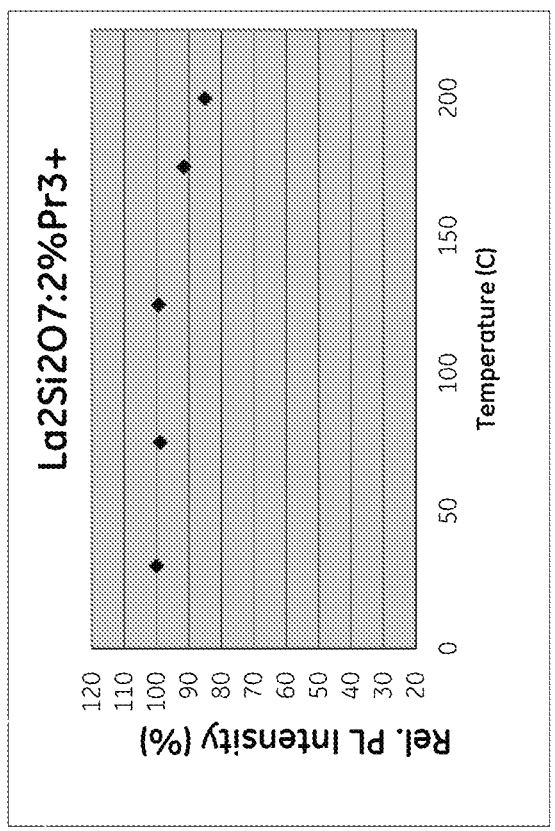
FIG. 3 is a graphical view of a temperature dependency of luminescence intensity of a lanthanum pyrosilicate ($La_2Si_2O_7$) composition with praseodymium doping, according to an embodiment of the present invention.
Figure 2:
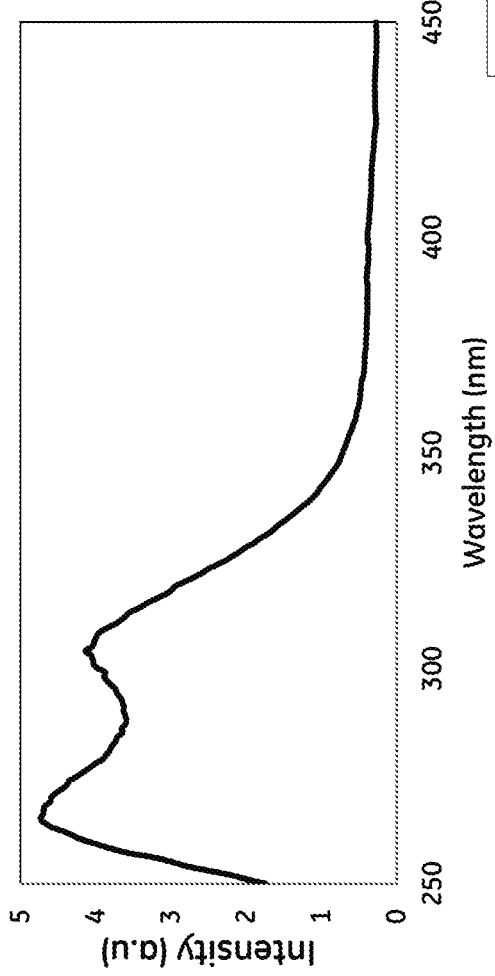
FIG. 2 is an emission wavelength spectra of a lanthanum pyrosilicate ($La_2Si_2O_7$) composition with praseodymium doping when excited with a 235 nm, according to an embodiment of the present invention.

In one embodiment, a lanthanum pyrosilicate ($La_2Si_2O_7$) with praseodymium doping is used as the scintillator material for the high-energy radiation. As used herein, praseodymium occupies lanthanum site after doping. This composition with 2% of praseodymium doping seems to have an emission wavelength in the range from about 250 nm to about 325 nm, when excited with a 235 nm wavelength as shown in FIG. 2, and has a good temperature stability of photoluminescence intensity as shown in FIG. 3, when studied using powder samples of this composition. In one embodiment, the scintillator material includes a rare-earth metal substituted lanthanum pyro silicate composition doped with praseodymium. In one embodiment, the scintillator material includes an yttrium substituted lanthanum pyro silicate composition doped with praseodymium $[(La_xY_{1-x})_2Si_2O_7:Pr]$, (alternately $[La_x(Y+Pr)_{1-x})_2Si_2O_7]$, $0<x<1$. Various compositions in this composition range are applicable as scintillator single crystal for the high energy radiation detection as they were found to be emitting photons in the required wavelength range of about 250 nm to about 375 nm for the high-energy radiation detection. In one embodiment, a single crystal of $(La_xY_{1-x})_2Si_2O_7:Pr$ is used as a scintillator with the compositional variation of $0.2<x<0.8$. In a particular embodiment, a single crystal of $(La_{0.6}Y_{0.4})_2Si_2O_7$ with 2% praseodymium doping in lanthanum (or yttrium) site is grown and used as a scintillator 12 for the detection of gamma rays in a down-hole drilling application.

In one embodiment, the scintillator is a perovskite halide with the composition $ABCl_{3-y}X_y$ with praseodymium ion as the activator substituting B site. As used herein, A is cesium, rubidium, potassium, sodium, silver, or any combinations of any of cesium, rubidium, potassium, sodium, and silver. B is calcium, barium, strontium, magnesium, cadmium, zinc, or any combinations of any of calcium, barium, strontium, magnesium, cadmium, and zinc. X may be bromine, iodine, or a combination of bromine and iodine. y may be 0 or may be varying between 0 and 3 without including the end points.

Accordingly, in one embodiment, the scintillator single crystal used herein is $CsCaCl_3:Pr$. In another embodiment, the scintillator composition is a partially barium substituted cesium calcium chlorine with praseodymium doping in calcium site with the composition $CsCaCl_{3-y}Br_y:Pr$, and $(0<y\leq1)$.

As alluded above, when the activator is incorporated into the $ABX_3$ perovskite lattice, it takes the place of the divalent species B in the lattice. Charge compensation occurs by creation of defects and vacancies. This could lead to reduction in the luminescence intensity of the composition. A charge compensator is incorporated along with the activator into the lattice to help increase the efficiency by avoiding creation of defects and vacancies. For a halide perovskite with a trivalent praseodymium ion as activator, charge-compensator used is at least one of monovalent sodium or lithium ions.

In another embodiment of the scintillator composition, the matrix material used herein is in the form of a solid solution of at least two halide-perovskites. As used herein, the term "solid solution" refers to a mixture of the halide perovskites in solid, crystalline form, which may include a single phase, or multiple phases. For example, the perovskite halide may have element A as a combination of any two, three or four elements of the group cesium, rubidium, potassium, and sodium. In another example, the solid solution is based on a mixture of a first halide perovskite and a second halide perovskite at any desirable ratio.

In one embodiment, the scintillator is an elpasolite with praseodymium ion activator. Elpasolites are particularly suited for scintillator application as it is straightforward to grow single crystals of elpasolites from melt. In one embodiment, the scintillator single crystal is of the composition $A_2(Li, Na)LaCl_{6-y}X_y$:Pr, wherein A is cesium, rubidium, potassium, sodium, silver, or any combinations thereof. X may be bromine, iodine, or a combination of bromine and iodine. "y" may be 0 or may be varying between 0 and 3 without including the end points. Praseodymium may get doped in the lanthanum site in this composition.

Figure 4:
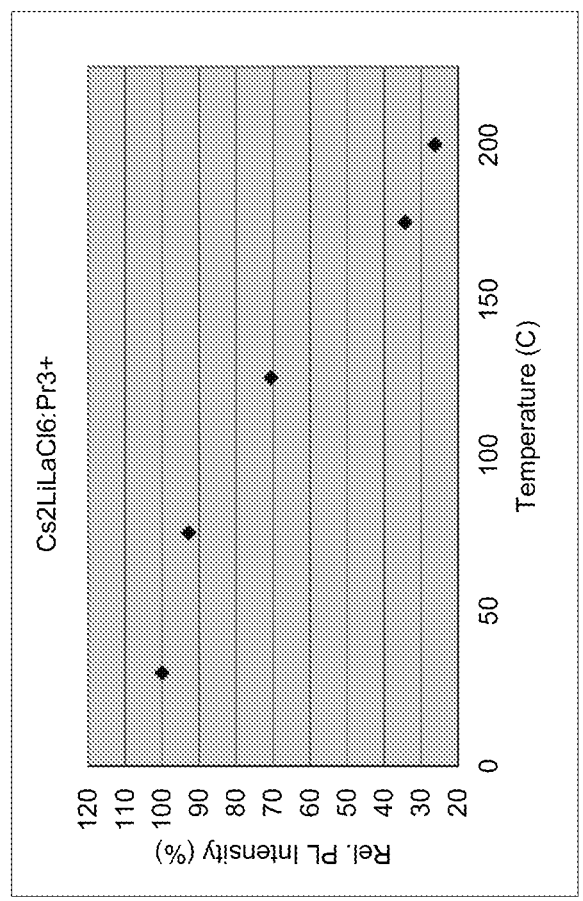
FIG. 4 is a graphical view of a temperature dependency of luminescence intensity of view of a $Cs_2LiLaCl_6$:Pr composition, according to an embodiment of the present invention.

An elpasolite composition generally used in the scintillator composition is $Cs_2LiYCl_6$ (CLYC) activated by cerium. This composition seems to have a good high temperature stability of emission properties. A composition $Cs_2LiYCl_6$:Pr is also known, but the useful scintillator properties of this composition are need to be studied. In one embodiment, it was found that a slight substitution of barium in the chlorine site of CLYC deteriorates the high temperature stability of the emission of these compositions. In another embodiment, a scintillator single crystal of the composition $Cs_2LiLaCl_6$:Pr is used in a radiation detector apparatus. It was found that, the emission efficiency of this composition (studied using powder samples) drops more than 75% at a temperature greater than about 200° C. as shown in FIG. 4.

Figure 5:
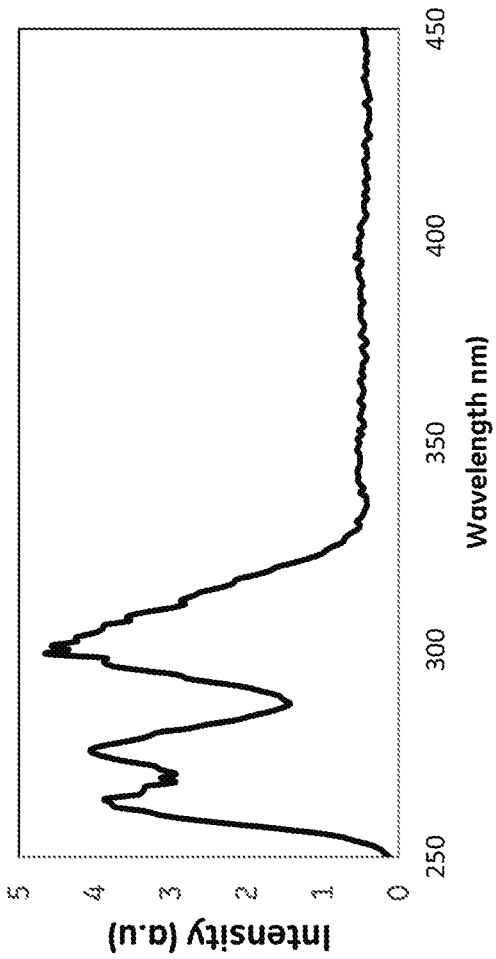
FIG. 5 is an emission wavelength spectra of $Cs_2NaLaCl_6$:Pr composition with praseodymium doping when excited with a 235 nm, according to an embodiment of the present invention.
Figure 6:
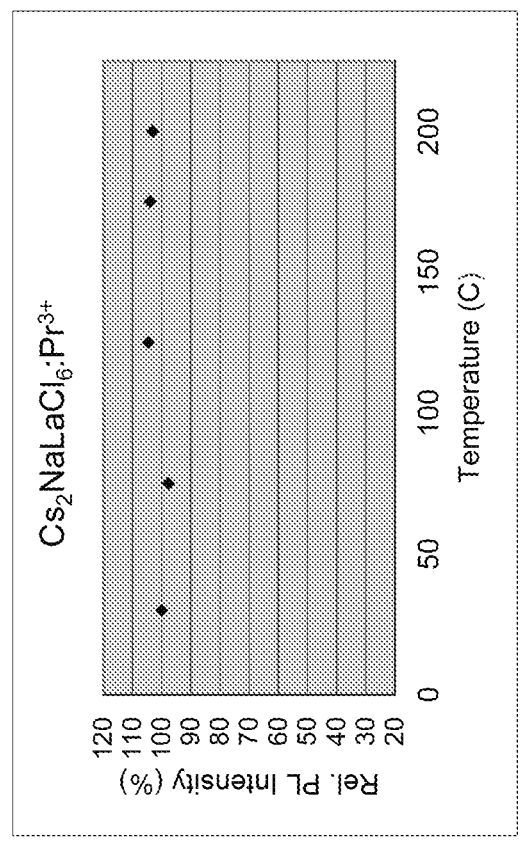
FIG. 6 is a graphical view of a temperature dependency of luminescence intensity of a $Cs_2NaLaCl_6$:Pr, according to an embodiment of the present invention.
Figure 7:
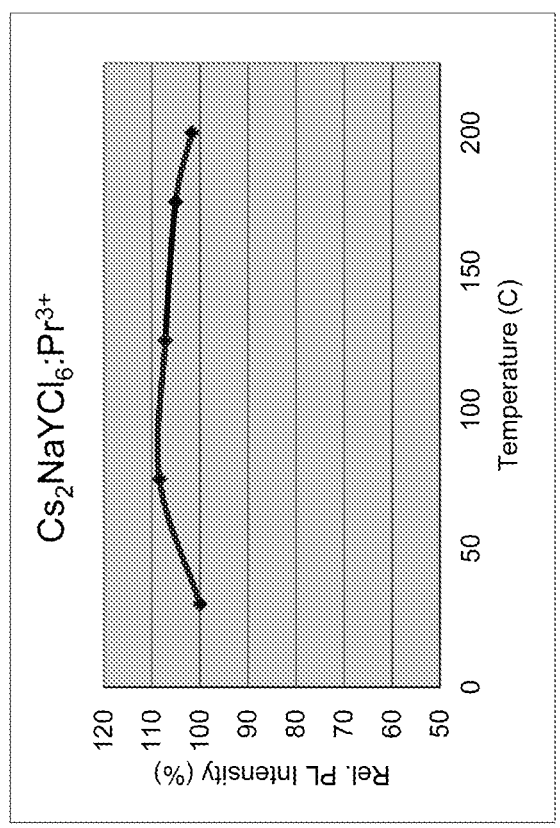
FIG. 7 is a graphical view of a temperature dependency of luminescence intensity of a $Cs_2NaYCl_6$:Pr, according to an embodiment of the present invention.

In one embodiment, a scintillator single crystal of the composition $Cs_2NaLaCl_{6-y}Br_y$:Pr, (0≤y≤1), with praseodymium doping in lanthanum site is used. In a particular embodiment, a composition of $Cs_2NaLaCl_6$:Pr is used and is found to be having a spectral match with an SiC APD. FIG. 5 shows an emission wavelength in the range from about 250 nm to about 325 nm, when excited with 235 nm wavelength. A high temperature stability of luminescence intensity of this composition can be seen as in FIG. 6, when studied using powder samples. In another particular embodiment, a composition of $Cs_2NaYCl_6$:Pr is used and is found to be having a spectral match with an SiC APD and also high temperature stability of emission efficiency as shown in FIG. 7, when studied using powder samples.

In one particular embodiment, a scintillator single crystal of the composition $Cs_2(Li,Na)LaCl_{6-y}Br_y$:Pr, and (0≤y≤1) is used. A composition of $Cs_2Li_{0.5}La_{0.5}Cl_6Br$:Pr used in the single crystal form as a scintillator in a high-energy detection apparatus is found to be having a spectral match with an SiC APD and also high temperature stability of luminescence intensity. There was only about 20% decrease in the luminescence intensity observed for this scintillator at an operating temperature of about 200° C.

In one aspect of the invention, a method for detecting high-energy radiation in a wide temperature range by using a scintillator is disclosed. The temperature range in which the scintillator operates may be 200° C. or more. The scintillator may be operated at harsh environments of high temperature and high vibration.

A goal of a scintillator of an embodiment of the present invention involves detecting high-energy radiation such as gamma rays, neutrons, or X-rays. The scintillator of an embodiment of the present invention may be used specifically in harsh (e.g., high vibration, high temperature, etc.) environments, requiring robust materials. In one embodiment, the scintillator single crystal is exposed to the high energy radiation at a shock level in a range from about 20 Grms to about 30 Grms. In a particular embodiment, the scintillator single crystal is exposed to the high energy radiation at a shock level of nearly about 25 Grms.

Accordingly, a method for detecting a high energy radiation in a harsh environment down-hole drilling or wire line application includes exposing a scintillator to the high energy radiation and producing photons, and detecting the photons by an avalanche photodiode at a temperature greater than about 175° C. APDs working in linear mode may be used for some oil well drilling applications. However, APDs working in linear mode may be temperature sensitive, thereby reducing sensitivity and energy resolution of the detector.

In one embodiment, a charge carrier created by detected photons is accelerated by an applied high electric field to sufficiently high kinetic energy. It creates secondary charge pairs through impact ionization, resulting in high gain. In a Geiger mode, the APD is operated beyond its break down voltage, resulting in further impact ionization and high gain. A single APD may be limited in detection area, light collection and detection of radiation events. In some of the oil well drilling application, distinguishing between low and high photon fluxes is desired. An array of APDs is capable of detecting multiple photons and scales to larger detection area, but APD arrays made with silicon semiconductor may lose its sensitivity with increasing temperatures.

In one embodiment, the device 20 (FIG. 1) used is a solid state photo multiplier (SSPM) device, which includes an array of single pixel (microcell) of avalanche photodiode (APD) operating in Geiger mode. Herein the array is biased above the breakdown voltage, and a single absorbed and captured photon can trigger avalanche. Avalanche causes the charge stored in each APD to discharge in a fast current pulse. A quenching device used along with an APD may limit the recharging current.

In one embodiment, the system 10 may include a large number of solid state photo multiplier devices 20 tiled adjacent to one another covering a comparatively large area. In one embodiment, the arrays of solid state photo multiplier devices are tiled adjacent to one another in the system 10 to cover an area of 5 mm² or more.

The detected photons are further processed to be converted into electrical signals using an associated electronics operating at temperature greater than about 175° C.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A method for detecting a high-energy radiation in a harsh environment, the method comprising:
   exposing a scintillator single crystal to the high energy radiation at a temperature greater than about 175° C.; and
   detecting the high energy radiation with an avalanche photodiode coupled to the scintillator single crystal, wherein the scintillator single crystal is CsCaCl3-yBry:Pr and (0<y≤1);
   wherein a luminescence intensity of the scintillator single crystal at a temperature greater than 200° C. is greater than about 60% of the luminescence intensity of the scintillator single crystal at room temperature;
   wherein the scintillator single crystal produces photons in an emission wavelength ranging from about 275 nm to about 350 nm;
   wherein the amount of praseodymium present in the scintillator single crystal composition ranges from about 0.5 mol % to about 10 mol %; and
   wherein the scintillator single crystal is exposed to the high energy radiation at a shock level greater than about 20 Grms.

2. The method of claim 1, wherein a luminescence intensity of the scintillator single crystal at a temperature greater than 200° C. is greater than about 75% of the luminescence intensity of the scintillator single crystal at room temperature.

3. The method of claim 1, wherein the high-energy radiation is a gamma radiation.

4. An apparatus for detecting a high-energy radiation in a harsh environment, the apparatus comprising:
   a scintillator single crystal; and
   an avalanche photodiode coupled to the scintillator single crystal, wherein the scintillator single crystal is configured to operate at a temperature greater than about 175° C. and at a shock level in the range from about 20 Grms to 30 Grms, and comprises a praseodymium doped composition comprising CsCaCl3-yBry:Pr and (0<y≤1);
   wherein a luminescence intensity of the scintillator single crystal at a temperature greater than 200° C. is greater than about 60% of the luminescence intensity of the scintillator single crystal at room temperature;
   wherein the scintillator single crystal has an emission wavelength in a range from about 275 nm to about 350 nm; and
   wherein the amount of praseodymium present in the scintillator single crystal ranges from about 0.5 atomic % to about 10 atomic %.

5. The apparatus of claim 4, wherein a luminescence intensity of the scintillator single crystal at a temperature greater than 200° C. is greater than about 75% of the luminescence intensity of the scintillator single crystal at room temperature.

6. The apparatus of claim 4, wherein the amount of praseodymium present in the scintillator single crystal ranges from about 0.5 atomic % to about 3 atomic %.

* * * * *